C. BERG.
AUTOMOBILE.
APPLICATION FILED MAR. 14, 1908.
945,365.
Patented Jan. 4, 1910.
2 SHEETS—SHEET 1.
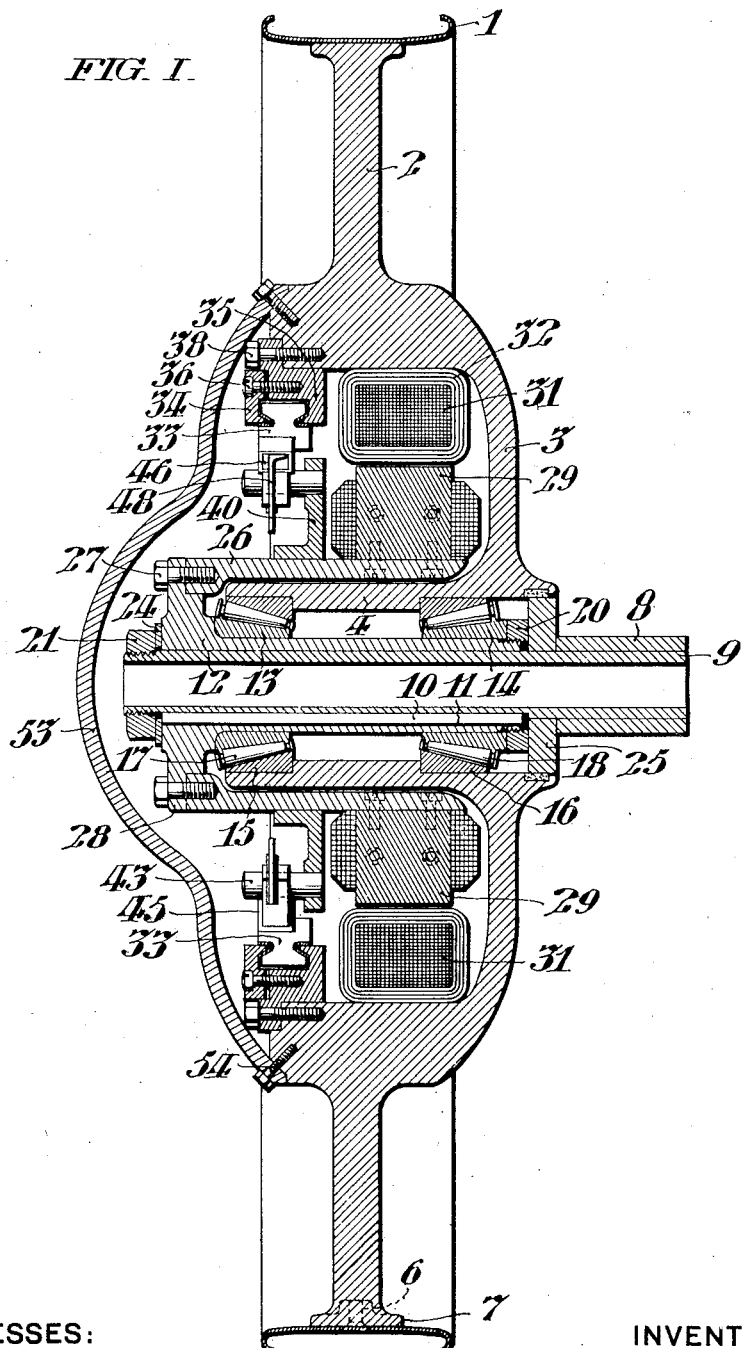
WITNESSES:
Clifton C. Hallowell
Morris L. Jensen
INVENTOR:
CHARLES BERG,
by Arthur E. Paige
Atty.

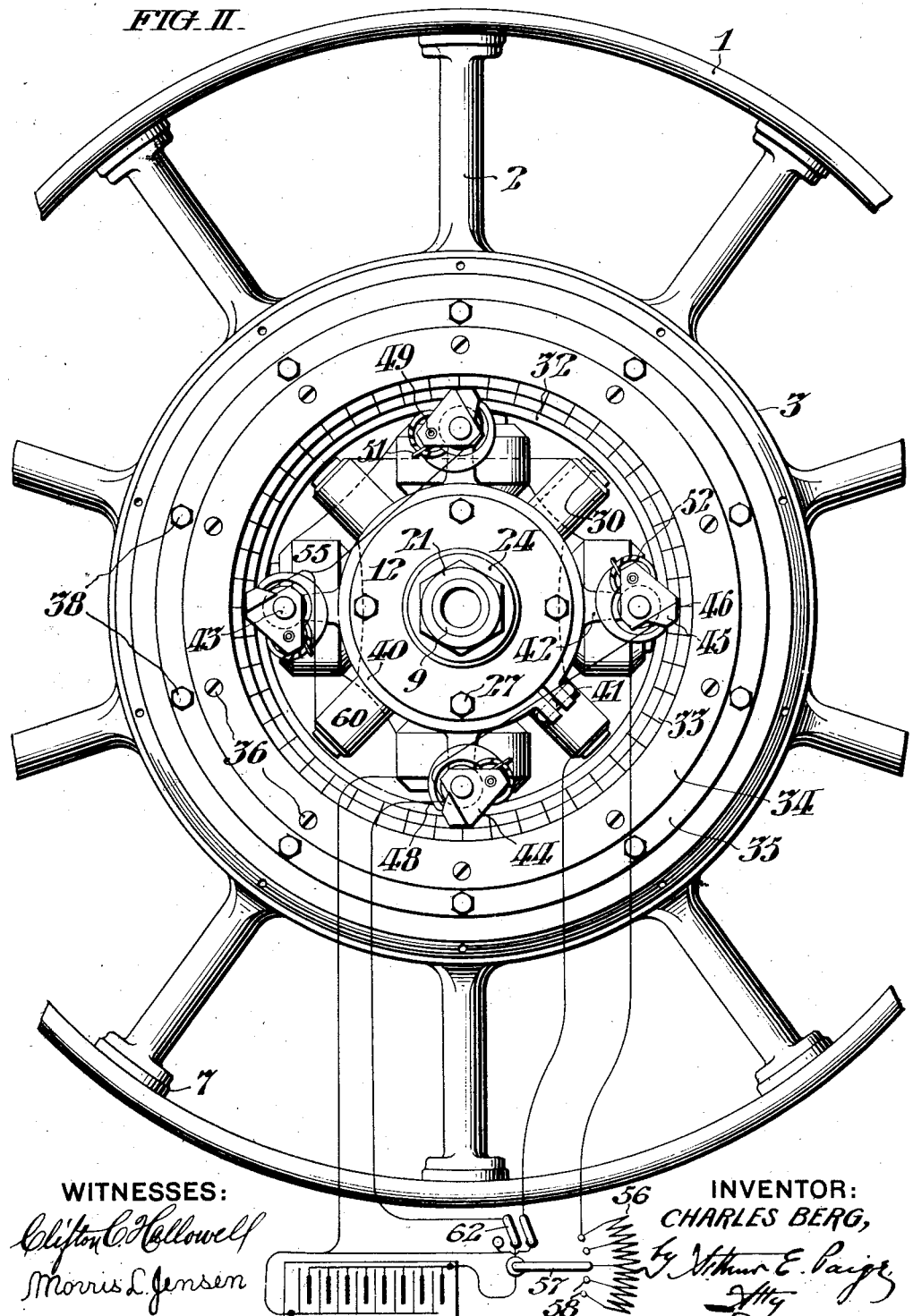

UNITED STATES PATENT OFFICE.

CHARLES BERG, OF PHILADELPHIA, PENNSYLVANIA.

AUTOMOBILE.

945,365.   Specification of Letters Patent.   Patented Jan. 4, 1910.

Application filed March 14, 1908. Serial No. 421,031.

*To all whom it may concern:*

Be it known that I, CHARLES BERG, of Philadelphia, in the county of Philadelphia and State of Pennsylvania, have invented a certain new and useful Improvement in Automobiles, whereof the following is a specification, reference being had to the accompanying drawings.

My improvement relates to an electrically propelled automobile of the type comprising a road wheel having a driving motor in its hub, and it is an object of my invention to provide such a motor wheel capable of operation in either direction at variable speed and without sparking at the commutator.

In the form of my invention hereinafter described, the motor armature is a Gramme ring which is carried by the vehicle wheel, and the field is of the interpolar type and carried within the armature by the stationary axle upon which the vehicle wheel is mounted to rotate. Said motor field comprises main polar projections and auxiliary polar projections which are included in separate circuits respectively in shunt and series relation to the armature windings and means are provided to adjustably vary the current in said main field circuit independently of the current in the auxiliary field circuit. The main field being weakened in accordance with increase in speed of rotation of the armature, weakening of the field of commutation is prevented, the auxiliary polar projections producing the required compensatory field of commutation, independently of the main field, and, consequently, said armature and the vehicle wheel which carries it, may be rotated in either direction at variable speed without sparking at the commutator.

My invention comprises the various novel features of construction and arrangement hereinafter more definitely specified.

In the drawings; Figure I, is a vertical sectional view of a vehicle wheel and axle conveniently embodying my improvement. Fig. II, is an elevation of the outer face of said wheel with the motor casing cap removed.

In said drawings; the vehicle wheel comprises the rim 1, spokes 2, annular motor casing 3, and hub 4. As indicated, said spokes, casing and hub are conveniently formed in integral relation, and the rim detachably secured to said spokes by the bolts 6, extending through the spoke flanges 7. Said wheel is mounted to rotate on an axle which may be attached to the vehicle, in any convenient manner, so that it cannot rotate.

As shown in Fig. I, the axle is conveniently formed of two rigidly connected cylindrical steel tubes 8, and 9, the latter having the key 10, engaging the keyway 11, in the removable sleeve 12, which is thus prevented from turning on said axle. Said sleeve 12, carries the oppositely inclined roller bearing rings 13, and 14, which are opposed to the roller bearing rings 15, and 16, in said hub 4, so that said wheel may turn freely on the conical rollers 17, and 18, which are interposed between said bearing rings. Said roller bearings may be adjusted by rotating the nut 20, on the inner end of said sleeve 12, and, when adjusted, said nut 20, is prevented from turning by the nut 21, which is rotated on the axle tube 9, until the washer 24, sleeve 12, and nut 20, are forced inwardly and the latter binds upon the collar 25, which is secured in rigid relation with the axle tubes 8 and 9. Said sleeve 12, supports in stationary rigid relation with said axle, the motor field frame which comprises the hollow cylindrical tube 26, rigidly connected by the bolts 27, with the flange 28, on said sleeve 12. Said tube 26, is provided with the radial main polar projections 29, and auxiliary polar projections 30, which are presented within and in operative relation with the Gramme ring armature comprising the annular core 31, and windings 32. Said armature windings 32, are connected in any convenient manner with the segments 33, of the commutator which comprises the opposed annular frame members 34, and 35, which are maintained in separable relation by the screws 36, and maintained in detachable rigid relation with the wheel by the bolts 38. Said field frame 26, supports the brush frame 40, which, as shown in Fig. II, comprises a split ring which may be adjustably clamped on said frame 26, by the bolt 41. Said frame 40, also comprises the four radial arms 42, having the studs 43, which support the brush holders 44, comprising the rectangular tubes 45, through which the carbon block brushes 46, are presented in contact with the armature segments 33, under pressure of the rocker arms 48, which are pivoted at 49, in said brush holders 44. Said arms 48, are pressed upon said blocks 46, by the springs 51, the outer ends of which may be selectively engaged with any one of the notches 52, to adjustably vary the pressure of contact of the brushes 46, on the commutator. Said motor casing 3, is provided with the removable cap 53, detachably secured thereon by the bolts 54, and it may be observed that upon removal of said cap 53, all of the elements of the motor are accessible to the operator without removing the wheel from the axle. Moreover, the whole wheel with its roller bearings may be instantly removed from the axle when the nut 21, is removed.

It is to be understood that suitable wiring connections for said motor may extend through the hollow axle to a controller and storage battery in the vehicle. As indicated diagrammatically in Fig. II, the main field coils 55, are connected in series relation with a resistance 56, which may be varied by movement of the lever 57, with respect to the contacts 58, and said main field coils 55, are in shunt relation with the armature windings 32. The auxiliary field coils 60, are included in a separate circuit in series relation with each other and with said armature windings 32, and said circuit includes the double pole switch 52, whereby the direction of the current may be reversed with respect to said auxiliary field and armature to reverse the rotation of the latter.

I do not desire to limit myself to the precise details of construction and arrangement above described, as it is obvious that various modifications may be made therein without departing from the essential features of my invention, as defined in the appended claims.

I claim:—

1. The combination with a vehicle wheel; of an annular armature and an annular commutator carried by said wheel in rigid relation therewith; a stationary axle upon which said wheel is mounted to rotate; a field comprising a series of polar projections extending within said armature; and, means distinct from said axle and including a sleeve carried by the wheel maintaining said armature, commutator and field in coöperative relation; whereby said wheel may be removed from said axle without disturbing the relation of said coöperative elements.

2. The combination with a vehicle wheel, of an annular armature and an annular commutator carried by said wheel in rigid relation therewith; a stationary axle, upon which said wheel is mounted to rotate; two fields comprising alternate series of polar projections extending within said armature; and, means distinct from said axle and including a sleeve carried by the wheel maintaining said armature, commutator and field in coöperative relation; whereby said wheel may be removed from said axle without disturbing the relation of said coöperative elements.

3. The combination with a vehicle wheel, of a Gramme ring armature carried by said wheel in rigid relation therewith; a commutator operatively connected with said armature and also carried by said wheel; a field carried by said axle within said armature, comprising main polar projections, and auxiliary polar projections interposed between said main polar projections; coils respectively arranged to energize said main polar projections and auxiliary polar projections; and, means distinct from said axle and including a sleeve carried by the wheel maintaining said armature, commutator and field in coöperative relation; whereby said wheel may be removed from said axle without disturbing the relation of said coöperative elements.

4. The combination with a vehicle wheel; of a Gramme ring armature carried by said wheel in rigid relation therewith; a commutator operatively connected with said armature and also carried by said wheel; a field carried by said axle within said armature, comprising main polar projections, and auxiliary polar projections, interposed between said main polar projections; coils respectively arranged to energize said main polar projections and auxiliary polar projections; means connecting said main field coils in shunt relation to the armature windings; means connecting said auxiliary field coils in series relation to the armature windings; means arranged to adjustably vary the strength of the current in said main field independently of said auxiliary field; and, means distinct from said axle and including a sleeve carried by the wheel maintaining said armature, commutator and field in coöperative relation;-whereby said wheel may be removed from said axle without disturbing the relation of said coöperative elements.

5. The combination with a vehicle wheel; of a Gramme ring armature and commutator for the same; means detachably rigidly connecting said armature and commutator with said wheel; a stationary axle upon which said wheel is mounted to rotate; a stationary field comprising a circular series of polar projections rigidly connected with said axle and presented in operative relation with said armature within the latter; a motor casing carried by said wheel inclosing said armature and field; and, means distinct from said axle and including a sleeve carried by the wheel maintaining said armature, commutator and field in coöperative relation; whereby said wheel may be removed from said axle without disturbing the relation of said coöperative elements.

6. The combination with a vehicle wheel;

of a stationary axle upon which said wheel is mounted to rotate; an annular Gramme ring armature and an annular commutator carried by said wheel in rigid relation therewith; a motor field frame rigidly connected with said axle in operative relation with said armature within the latter; a brush frame adjustably supported by said field frame, having a series of brushes presented in operative relation with said commutator within the latter; and, means distinct from said axle and including a sleeve carried by the wheel maintaining said armature, commutator and field in coöperative relation; whereby said wheel may be removed from said axle without disturbing the relation of said coöperative elements.

In testimony whereof, I have hereunto signed my name at Philadelphia, Pennsylvania, this twelfth day of March, 1908.

CHARLES BERG.

Witnesses:
F. R. SHATTUCK,
A. J. DOTY.